United States Patent
Oberg et al.

(10) Patent No.: US 8,995,242 B1
(45) Date of Patent: *Mar. 31, 2015

(54) METHOD AND SYSTEM FOR RADIAL AND TANGENTIAL TILT CALIBRATION OF OPTICAL STORAGE SYSTEMS

(71) Applicant: Marvell International Ltd., Hamilton (BM)

(72) Inventors: Mats Oberg, Cupertino, CA (US); Zachary Keirn, Boulder, CO (US); Christopher Painter, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,333

(22) Filed: Sep. 18, 2013

Related U.S. Application Data

(63) Continuation of application No. 13/570,657, filed on Aug. 9, 2012, now Pat. No. 8,553,510, which is a continuation of application No. 13/053,967, filed on Mar. 22, 2011, now Pat. No. 8,243,569, which is a continuation of application No. 12/111,055, filed on Apr. 28, 2008, now Pat. No. 7,933,181.

(60) Provisional application No. 60/914,473, filed on Apr. 27, 2007.

(51) Int. Cl.
G11B 7/00 (2006.01)
G11B 7/095 (2006.01)

(52) U.S. Cl.
CPC .................................. *G11B 7/0956* (2013.01)

USPC .................. 369/53.19; 369/44.32; 369/47.49

(58) Field of Classification Search
None
See application file for complete search history.

(56) References Cited

U.S. PATENT DOCUMENTS

| 7,808,866 | B2 | 10/2010 | Lee et al. |
| 2002/0118615 | A1 | 8/2002 | Jeong |
| 2005/0117504 | A1 | 6/2005 | Ogawa et al. |
| 2005/0152240 | A1 | 7/2005 | Ma et al. |

FOREIGN PATENT DOCUMENTS

WO   WO 2007/034771 A1   3/2007

OTHER PUBLICATIONS

Ichimura, et al., "Radial Tilt Adjustment Method and Partial Response Signal-to-Noise Ratio in High-Density Optical Recording," Jun. 5, 2006, Optical Data Storage Topical Meeting, pp. 174-176.

Park, et al., "PRML Detection Using Signal Quality Measure Method for Asymmetric Optical Recording Channels," Jul. 10, 2005, International Symposium on Optical Memory and Optical Data Storage, TuP6.

*Primary Examiner* — Adam R Giesy

(57) ABSTRACT

A system and method for adjusting the radial tilt, tangential tilt, or a combination of radial and tangential tilt of an optical detection unit in an optical disc reading system can include applying different weighting factors to different signal components depending on which detection area detects the component, measuring a value of a signal characteristic, such as signal-to-noise ratio, of two signals with different sets of weighting factors, and determining an adjustment factor to the radial tilt as a function of the of the measured signal characteristic values.

20 Claims, 4 Drawing Sheets

METHOD AND SYSTEM FOR RADIAL AND TANGENTIAL TILT CALIBRATION OF OPTICAL STORAGE SYSTEMS

CROSS REFERENCE TO RELATED APPLICATION

This application is a continuation of U.S. application Ser. No. 13/570,657, filed Aug. 9, 2012, which was issued as U.S. Pat. No. 8,553,510 on Oct. 8, 2013, which is a continuation of U.S. application Ser. No. 13/053,967, filed Mar. 22, 2011, which was issued as U.S. Pat. No. 8,243,569 on Aug. 14, 2012, which is a continuation of U.S. application Ser. No. 12/111,055, filed Apr. 28, 2008, which was issued as U.S. Pat. No. 7,933,181 on Apr. 26, 2011, which claims priority under 35 U.S.C. §119(e) to U.S. Provisional Application No. 60/914,473, filed Apr. 27, 2007. The disclosures of the applications referenced above are incorporated herein by reference.

FIELD OF THE DISCLOSURE

Aspects of the present invention relate generally to optical disc systems for storing digital data, and more particularly to a method and system for calibrating the radial and/or tangential tilt of the optical detection unit in an optical disc reading system.

BACKGROUND

Optoelectronic storage media such as compact discs (CDs) and digital versatile discs (DVDs) are commonly used for storing digital data. A typical disc is a little over one millimeter thick and is predominantly made out of a material such as plastic. Data is coded onto the disc by creating a series of bumps in the plastic. The plastic can then be covered by a reflective material such as aluminum and a protective material such as acrylic. The series of bumps on the disc form a data track that begins at the center of the disc and spirals outward. In a CD, for example, the bumps may be smaller and may be spaced differently than in a DVD, high-density DVD (HD DVD), or Blu-ray Disc.

FIGS. 1a and 1b show a typical laser 101 and optical detection unit 102 in one type of optoelectronic processing device. The laser 101 directs a beam of light 103 towards a disc 104. If the beam of light 103 strikes a bump 105 as in FIG. 1a, then it might be reflected towards the optical detection unit (ODU) 102. If the beam of light 104 strikes where there is not a bump, sometimes referred to as a land 106, as in FIG. 1b, then the beam might be reflected away from the ODU 102. The changes in reflection can be transmitted as bits of digital data by the ODU 102 to processing circuitry 107 which processes the received data and provides an appropriate output, depending for example on whether the output is to be music, video, or another type of data.

DVDs, HD DVDs, China Format HD Discs (C-HD), Blu-ray Discs, and other optical disc-reading systems work using the same principles as the CD system described above, but they utilize lasers of a smaller wavelength than CDs that allow the bumps and lands to be smaller and spaced more closely together, thus allowing for more data to be stored on a disc of the same physical size. FIG. 2 shows an example of an optical disc 210 that may be used in such a system. The disc 210 contains a hole 211 at the center so that a drive motor can rotate it in the direction shown by the arrow 212. As the disc 210 rotates, a head assembly 213 containing an optical detector focuses on the reflection of a laser from the disc surface 210. In order to properly focus the optical detector, the disc-reading device must move the head assembly depending on the location of the data track being read. Because the bumps on the disc surface 210 are so small and must be read in rapid succession, the head assembly 213 must be able to move with extreme precision and achieve focus rapidly. Accordingly, the head assembly 213 is configured to move in two different manners. First, it can slide on an arm 214 along the x-axis, and second, it can make minor adjustments to its focus by rotating along the y-axis, thus changing the angle of the optical detector relative to the x-axis. This angle is commonly referred to as the radial tilt.

It is also common for the head assembly 213 to include a means, such as a drive motor, for rotating about the x-axis in order to adjust for a tilt in the disc 210 or a tilt of the optical detector. The angle of the optical detector relative to the y-axis is commonly referred to as the tangential tilt. In a typical system, both radial tilt and tangential tilt may be present.

Several methods exist in the art for calibrating the radial and tangential tilt. One such method includes sweeping a range of angles to determine which angle produces the fewest errors. Another method includes making incremental changes to the tilt based on whether signal quality, as judged by a signal characteristic such as signal-to-noise ratio, is improving or worsening. Both these methods, however, are undesirable because they are slow to arrive at a desired tilt angle. A more sophisticated method can be implemented that measures a signal-to-noise-ratio over separate and independent portions of a signal and uses the difference between those portions to calculate a desired tilt. Such a method may be faster than other methods known in the art, but it is still undesirable because it requires monitoring multiple independent variables, and as a result can require multiple data channels when configured into hardware, thus increasing the complexity and cost of implementation.

Therefore, there exists in the art a need for a new method and system for accurately and rapidly calibrating the radial and/or tangential tilt of an optical detection unit in an optical disc reading system. Additionally, there exists in the art a need for such a system that can be easily and inexpensively implemented into the hardware of an optical disc reading system.

SUMMARY

A device embodying aspects of the present invention can include an optical disc reading system containing an optical detection unit with multiple detection areas for detecting a signal reflected from the face of an optoelectronic storage medium. The optical disc reading system can be configured to apply different weighting factors to different signal components depending on which detection area detects the component. The system can further measure values of a signal characteristic, such as signal-to-noise ratio, of two signals with different sets of weighting factors, and determine an adjustment factor to the radial tilt as a function of the of the measured signal characteristic values. Based on the adjustment factor, the radial tilt of the optical detection unit can be altered. The same general method can be applied to tangential tilt, or to a combination of radial tilt and tangential tilt.

DETAILED DESCRIPTION

Aspects of the present invention include a novel method and system for calibrating radial tilt and/or tangential tilt in optical storage systems. Optimizing the tilt angle can result in better signal quality, and as a result, fewer errors. A method and system embodying aspects of the present invention can rapidly determine a desirable tilt angle with the use of minimal extraneous hardware. Although some of the descriptions of embodiments may only discuss radial tilt, the same systems and methods described can also be applied to tangential tilt or a combination of radial and tangential tilt without the use of inventive faculty.

Figure 1A:
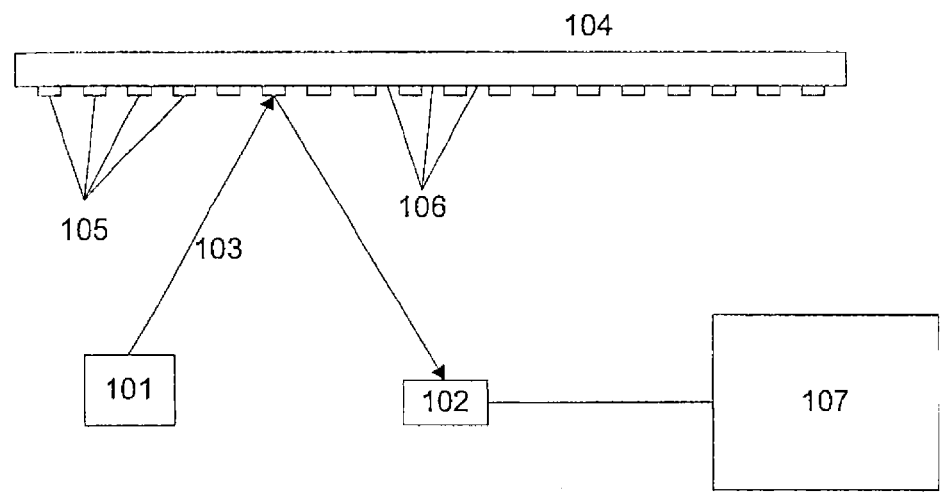
FIGS. 1a and 1b show examples of a system using a laser and an optical detector to read the bumps on a disc and transmit those bumps as digital data.
Figure 1B:
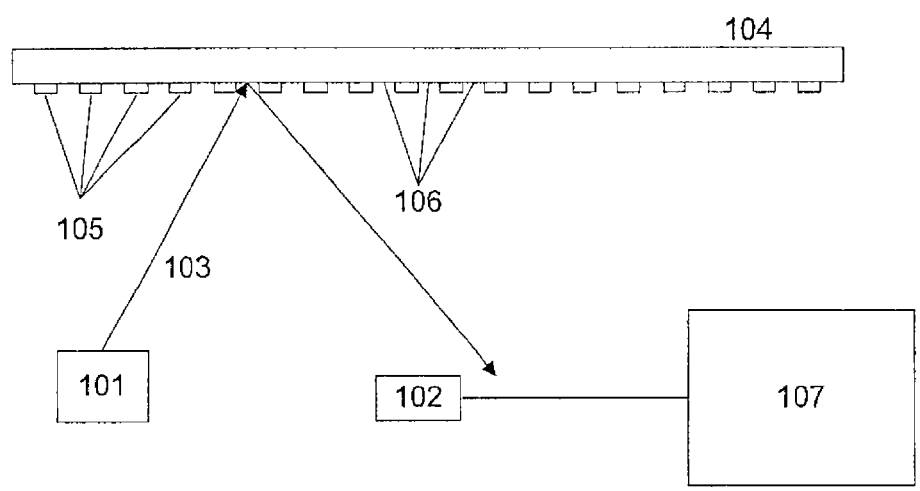
Figure 2:
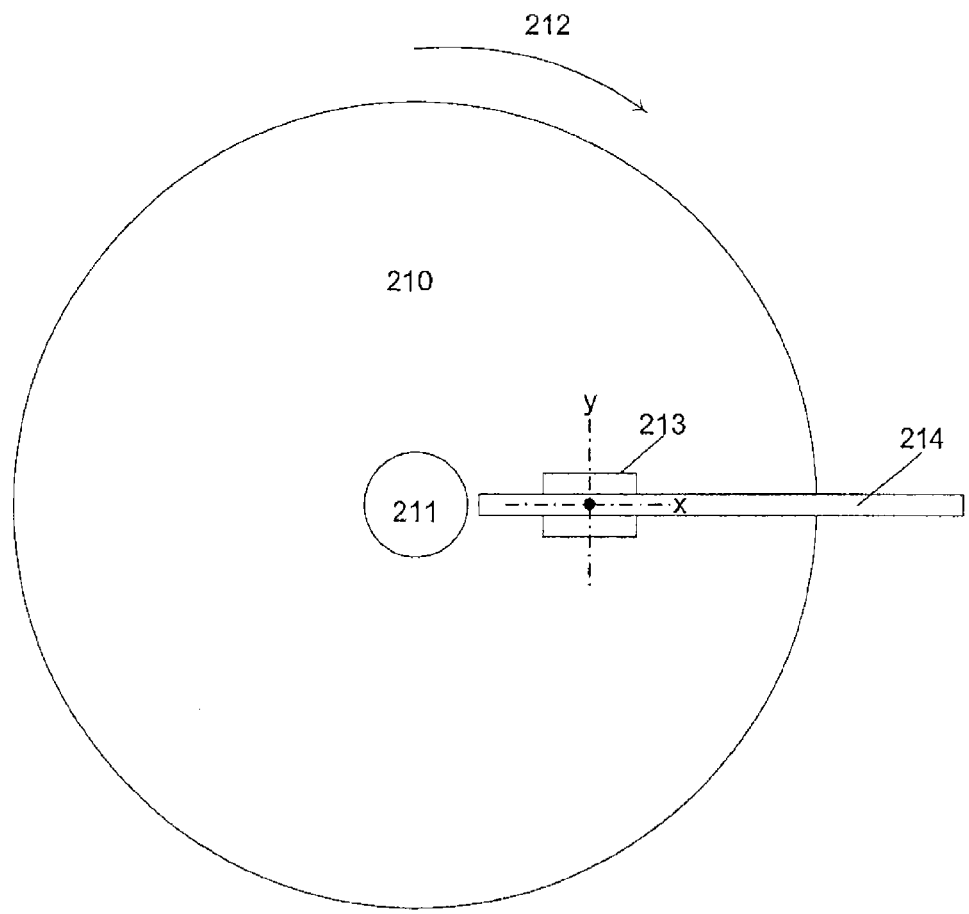
FIG. 2 shows an example of a system with a disc and a movable optical detection unit configured to read the disc.
Figure 3:
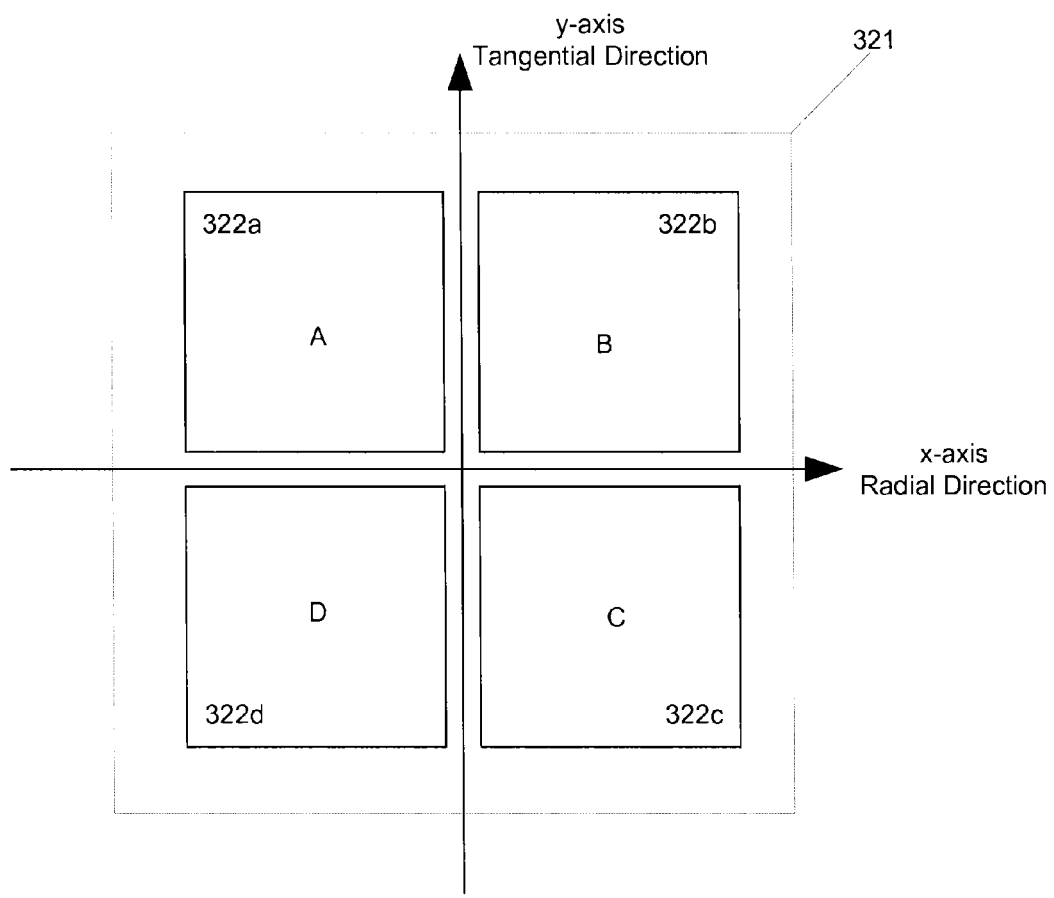
FIG. 3 shows an example of an optical detection unit configured to implement aspects of the present invention.

FIG. 3 shows an example of an optical detection unit (ODU) 321 that might be used in a system or method embodying aspects of the present invention. The ODU 321 can have multiple detection areas. For example, the ODU 321 of FIG. 3 has four photo diodes 322a-d. The signal detected (RF) by the ODU 321 can be the sum of the signals detected by the four photodiodes 322a-d (i.e. RF=A+B+C+D). When reading a disc, the ODU 321 can be oriented such that the radial direction is pointed towards the center of the disc, and the data track on the disc moves over the ODU 321 in the tangential direction.

The ODU 321 of FIG. 3 can be connected to a mechanism (not shown) for adjusting the ODU's 321 tilt in the radial direction by rotating it on its tangential axis (the y-axis). It is desirable to be able to adjust the radial tilt of the ODU 321 while still reading the data from the disc, i.e., without losing channel lock. An aspect of the present invention includes determining a desired radial tilt as a function of the balance of the individual photodiodes 321a-d. The balance of the photodiodes can be determined by calculating a partial response signal-to-noise ratio (PRSNR) for the signal detected by two photo diodes on one side of the y-axis (for example, 322a and 322d) and comparing it to the PRSNR for the signal detected by two photodiodes on the other side of the y-axis (for example, 322b and 322c). Once the two PRSNRs have been measured, a normalized difference of PRSNR (NDP) can be determined as follows:

$$NDP = \frac{PRSNR2 - PRSNR1}{PRSNR1 + PRNSR2},$$

where
PRSNR1=SNR(A, D) and PRSNR2=SNR(B, C).
PRSNR1 is the SNR of the signal detected by photodiodes 322a and 322d, and PRSNR2 is the SNR of the signal detected by photodiodes 322b and 322c.

NDP has an approximately linear correlation to radial tilt angle, and maximum SNR occurs at approximately the same tilt angle as where NDP=0. Therefore, once a value for NDP has been determined, a desired tilt angle can also be determined based on the linear relationship between NDP and tilt angle. The linear relationship between NDP and tilt angle can be determined by a system designer and can be built into the hardware or software of a system. Based on the desired tilt angle, the current tilt angle of the ODU can be adjusted to the desired tilt angle.

A further aspect of the present invention includes measuring NDP by determining the SNR of signals with weighted values for A, B, C, and D. For example, instead of determining values for PRSNR from the signals RF1=A+D and RF2=B+C, an aspect of the present invention includes calculating PRSNR1 and PRSNR2 from the following signals:

$$RF1(\alpha_1)=(2-\alpha_1)(A+D)+\alpha_1(B+C), \text{ where } 0\leq\alpha_1\leq2$$

and $$RF2(\alpha_2)=(2-\alpha_2)(A+D)+\alpha_2(B+C), \text{ where } 0\leq\alpha_2\leq2$$

The NDP can be calculated as discussed above with PRSNR1 equal to the measured SNR of $RF1(\alpha_1)$ and PRSNR2 equal to the measured SNR of $RF2(\alpha_2)$. Based on the determined NDP, a desired tilt angle can also be determined as discussed above.

Measuring values of PRSNR1 and PRSNR2 with unweighted values for A, B, C, and D (i.e. RF1=A+D and RF2=B+C) presents one of two challenges. Either the system will have to utilize one channel for passing data from the ODU to processing circuitry and rely on the signals of A+D and B+C individually to maintain data lock, or the system will have to have two data channels so that it can maintain data lock with a separate signal (for example, RF=A+B+C+D) while it measures PRSNR for RF1 and RF2. Relying on RF1=A+D and RF2=B+C to maintain data lock is an undesirable solution because those signals only have a portion of the full RF signal and may not be strong enough to maintain data lock, resulting in undesirable delays in processing data. While having a second channel can overcome this shortcoming, it too is undesirable because it requires costly additional hardware.

In order to avoid the problems discussed above, a system designer can choose values of $\alpha_1$ and $\alpha_2$ such that the signals $RF1(\alpha_1)$ and $RF2(\alpha_2)$ have sufficiently high SNR to maintain channel lock, thus avoiding the need for a second channel. For example, a system designer might choose $\alpha_1$ and $\alpha_2$ based on the following parameters: $\alpha_1=2-\alpha_2$ and $0.5<\alpha_2<1$.

Figure 4:
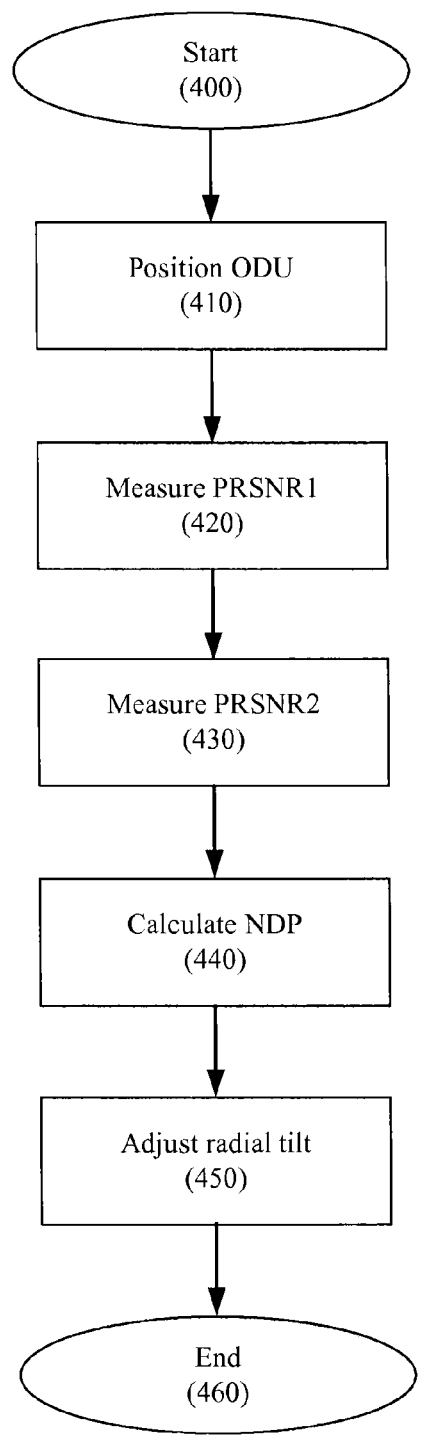
FIG. 4 shows a flow chart illustrating a method embodying aspects of the present invention.

FIG. 4 is a flow chart showing an example of a method embodying aspects of the present invention. The method begins when a system such as a Blu-ray Disc player is turned on or put into a play mode (block 400). An optical detection unit is positioned relatively to a data track on a disc (block 410). Once positioned, a value for PRSNR1 can be measured (block 420), and a value for PRSNR2 can be measured (block 430). From the values of PRSNR1 and PRSNR2, a value of NDP can be calculated (block 440). An adjustment to the radial tilt can be determined based on the calculated value of NDP (block 450). Once the adjustment to the radial tilt has been made, the method can finish (block 460).

For ease of discussion, the foregoing description has explained aspects of the present invention in terms of measuring SNR and partial response SNR. It will be readily apparent to an ordinary skilled artisan, however, that metrics other than SNR, such as metrics that are either proportional or inversely proportional to error rate, can also be used without deviating from the spirit of the present invention and without the use of inventive faculty. For example, a system designer might choose to measure a Viterbi margin metric (VMM) rather than PRSNR. VMM is generally a measure of how many times the path metric between the selected path and the next best path in the Viterbi detector is smaller than a certain threshold. The smaller VMM is, the better the channel is. Using VMM, it is possible to determine NDP as follows:

$$NDP = \frac{VMM1 - VMM2}{VMM1 + VMM2}$$

where VMM1 is approximately inversely proportional to PRSNR1 and VMM2 is inversely proportional to PRSNR2.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A method of adjusting a tilt of a sensor, comprising:
    generating a plurality of signals based on a plurality of detection signals wherein the plurality of detection signals are adjusted by a plurality of weighting factors, which are non-zeros, corresponding to each detection signal received from the sensor;
    measuring a plurality of values for a plurality of signal characteristics of the signals;
    calculating an amount of tilt adjustment as a function of at least two of the values; and
    adjusting the tilt of the sensor based on the amount of tilt adjustment.

2. The method of claim 1, wherein generating the plurality of signals is a function of the plurality of detection signals.

3. The method of claim 1, wherein generating the plurality of signals is based on sums of the plurality of detection signals.

4. The method of claim 1, further comprising:
    receiving the detection signals from a plurality of detection areas on opposite sides of an axis of the sensor.

5. The method of claim 4, wherein the axis is a tangential axis, and the tilt is a radial tilt.

6. The method of claim 4, wherein the axis is a radial axis, and the tilt is a tangential tilt.

7. The method of claim 1, wherein generating the signals comprises: generating a signal equals to $$\sum_{i=1}^{N} x_i \times A_i,$$

wherein $x_i$ is a weighting factor corresponding to a detection signal $A_i$.

8. The method of claim 1, wherein
    generating one of the signals based on the detection signals received at a first time; and
    generating another of the signals based on the detection signals received at a second time.

9. The method of claim 1, wherein
    generating one of the signals by a first circuitry based on the detection signals; and
    generating another of the signals by a second circuitry based on the detection signals.

10. The method of claim 1, wherein the signal characteristics include at least one of a signal-to-noise ratio (SNR) and a Viterbi margin metric.

11. A disc reading system, comprising:
    at least one or more circuitries configured to generate a plurality of signals based on a plurality of detection signals wherein the plurality of detection signals are adjusted by a plurality of weighting factors, which are non-zeros, corresponding to each detection signal received from a sensor;
    circuitry configured to measure a plurality of values for a plurality of signal characteristics of the signals;
    circuitry configured to calculate a tilt adjustment factor as a function of at least two of the values; and
    circuitry configured to adjust a tilt of the sensor based on the tilt adjustment factor.

12. The disc reading system of claim 11, wherein the plurality of signals is generated as a function of the plurality of detection signals.

13. The disc reading system of claim 11, wherein the plurality of signals is generated based on sums of the plurality of detection signals.

14. The disc reading system of claim 11, wherein the sensor is configured to generate the detection signals from a plurality of detection areas on opposite sides of an axis of the sensor.

15. The disc reading system of claim 14, wherein the axis is a tangential axis, and the tilt is a radial tilt.

16. The disc reading system of claim 14, wherein the axis is a radial axis, and the tilt is a tangential tilt.

17. The disc reading system of claim 14, wherein each of the generated signals equals to $$\sum_{i=1}^{N} x_i \times A_i,$$

wherein $x_i$ is a weighting factor corresponding to a detection signal $A_i$.

18. The disc reading system of claim 14, wherein one of the generated signals is based on the detection signals received at a first time, and another of the generated signals is based on the detection signals received at a second time.

19. The disc reading system of claim 11, wherein the signal characteristics include at least one of a signal-to-noise ratio (SNR) and a Viterbi margin metric.

20. The disc reading system of claim 11, wherein at least one of a sum of a first set of the weighting factors and a sum of a second set of the weighting factors is larger than a threshold.

* * * * *